United States Patent [19]
Khalid

[11] Patent Number: 5,165,845
[45] Date of Patent: Nov. 24, 1992

[54] CONTROLLING STALL MARGIN IN A GAS TURBINE ENGINE DURING ACCELERATION

[75] Inventor: Syed J. Khalid, Palm Beach Gardens, Fla.

[73] Assignee: United Technologies Corporation, Hartford, Conn.

[21] Appl. No.: 789,557

[22] Filed: Nov. 8, 1991

[51] Int. Cl.⁵ .................... A01B 25/00; F01D 17/00; F03B 15/04
[52] U.S. Cl. ...................................... 415/17; 415/26; 415/30; 415/33; 415/47; 415/48; 415/49; 364/431.01; 364/431.02
[58] Field of Search ............... 415/17, 26, 30, 33, 415/36, 47, 48, 49; 364/431.01, 431.02

[56] References Cited

U.S. PATENT DOCUMENTS

| | | | |
|---|---|---|---|
| 3,614,253 | 10/1971 | Gaertner | 415/48 |
| 4,338,061 | 7/1982 | Beitler et al. | 415/47 |
| 4,849,895 | 7/1989 | Kervistin | 364/431.01 |
| 4,958,289 | 9/1990 | Sum et al. | 364/431.01 |

Primary Examiner—Edward K. Look
Assistant Examiner—Mark Sgantzos

[57] ABSTRACT

Stall margin in a gas turbine compressor is controlled during acceleration by synthesizing the thermal enlargement of critical compressor stages to synthesize the temporary increase in blade-case clearance during acceleration. The change in clearance is used to produce an augmenting stator vane deflection signal which is summed with a steady state vane deflection signal to increase deflection during acceleration until the clearance returns to a nominal level when the expansion of the compressor parts stabilize.

6 Claims, 4 Drawing Sheets

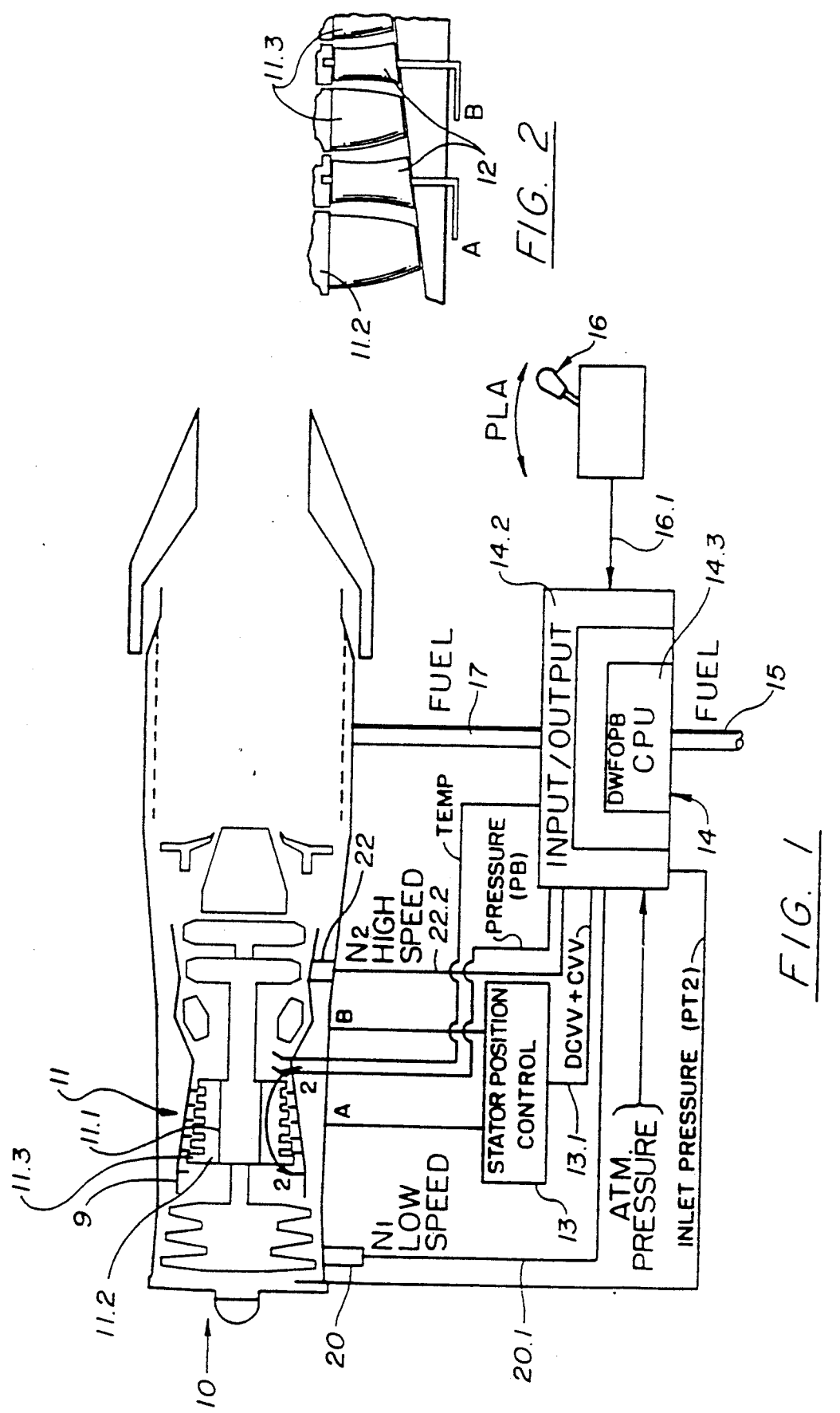

CONTROLLING STALL MARGIN IN A GAS TURBINE ENGINE DURING ACCELERATION

CROSS REFERENCE TO OTHER APPLICATIONS

1. Technical Field

This invention relates generally to gas turbine engines and specifically to controlling stall margin in gas turbine engines.

2. Background Art

Stators are used to control the efficiency of a gas turbine compressor and provide an acceptable level of compressor stall margin at the same time. U.S. Pat. No. 4,995,786, granted Feb. 16, 1991, shows one example of a stator arrangement. It is conventional knowledge that many factors contribute to the stall characteristics of a gas turbine engine, among them, the thermal characteristics of the gas compressor which changes the clearances (CL) between the compressor case and blades. The clearance changes the aerodynamic characteristics of the compressor blades and thus the angle of attack tolerance of the blades by creating different levels of turbulence, which increases with clearance. The principal purpose of the stators is to modify the angle of attack between the compressor blades and the incident airflow, to provide an acceptable stall margin.

Other factors that contribute to the stall characteristics of the gas turbine engine include incoming air total pressure (PT2) variation, the compressor pressure (PB), and the level of fuel enrichment (DWFOPB) during acceleration.

DISCLOSURE OF INVENTION

The present invention focuses primarily on modifying the stall margin during engine acceleration and subsequent thermal non-equilibrium condition; it is fundamentally predicated upon the discovery that during the accelerated phase the thermal characteristics of the compressor components do not track and can be synthesized to control the deflection of stator blades to provide an acceptable level of stall margin during acceleration and subsequent thermal non-equilibrium condition.

According to one aspect of the present invention, the normal stator adjustment for steady state engine operation is augmented to move the stator vanes to a point with greater deflection during acceleration/thermal non-equilibrium condition by synthesizing the change in the engine clearance during engine acceleration/thermal non/equilibrium condition as compared to normal clearance during steady state (thermally stabilized) operation.

According to another aspect of the invention, during engine power up or acceleration, a signal is synthesized indicating the beginning of this mode of operation and processed in such a way as to produce three signals, each having individual magnitudes that increase over time according to expected increase in radial size of certain compressor components as the engine heats up beginning with the start of acceleration. In particular, one signal is associated with the compressor disk, another with the compressor rim and blades, and another is associated with the compressor case. The signals associated with the disk, rim blades are subtracted from the signals associated with the case and the difference having a characteristic shape over time reflecting the change in clearance, which increases from a nominal value at idle to a maximum at some point during acceleration and then decreases to a level approaching the nominal level as the temperatures within the engine reach equilibrium after the compressor reaches a steady state speed $N_2$.

According to another aspect of the invention, the thermal time constant of each of these signals is scaled by a common scaling factor, based upon the actual compressor pressure. (For some applications it may be necessary to scale each of these time constants by a different function of compressor pressure to accurately represent the thermal expansion at all operating conditions).

According to another aspect of the invention, the signals are produced in response to a synthesized signal (TT3), indicating the beginning of acceleration. TT3 is produced by sensing the parameters compressor inlet total pressure (PT2), burner pressure (PB) and compressor inlet total temperature (TT2), computing compressor pressure ratio (OPR) by dividing PB by PT2, using OPR and PT2 in a pre-selected family of curves to obtain compressor temperature ratio TT3/TT2, and then multiplying TT3/TT2 by TT2 to obtain TT3. TT3 indicates the beginning of acceleration and its magnitude.

An object of the present invention is providing precise control of stall margin during acceleration. Other objects may be evident from the drawings and the following discussion.

BRIEF DESCRIPTION OF DRAWINGS

FIG. 1 is a functional block diagram showing a gas turbine engine and a computerized control system for controlling fuel flow to the engine and operation of a stator vane position control in response to various input signals provided to the fuel control.

FIG. 2 is a magnified view of a portion of the gas turbine compressor stage and fundamentally illustrates two stator vanes, such as those shown in U.S. Pat. No. 4,995,786, for controlling stall margin.

BEST MODE FOR CARRYING OUT THE INVENTION

Figure 3:
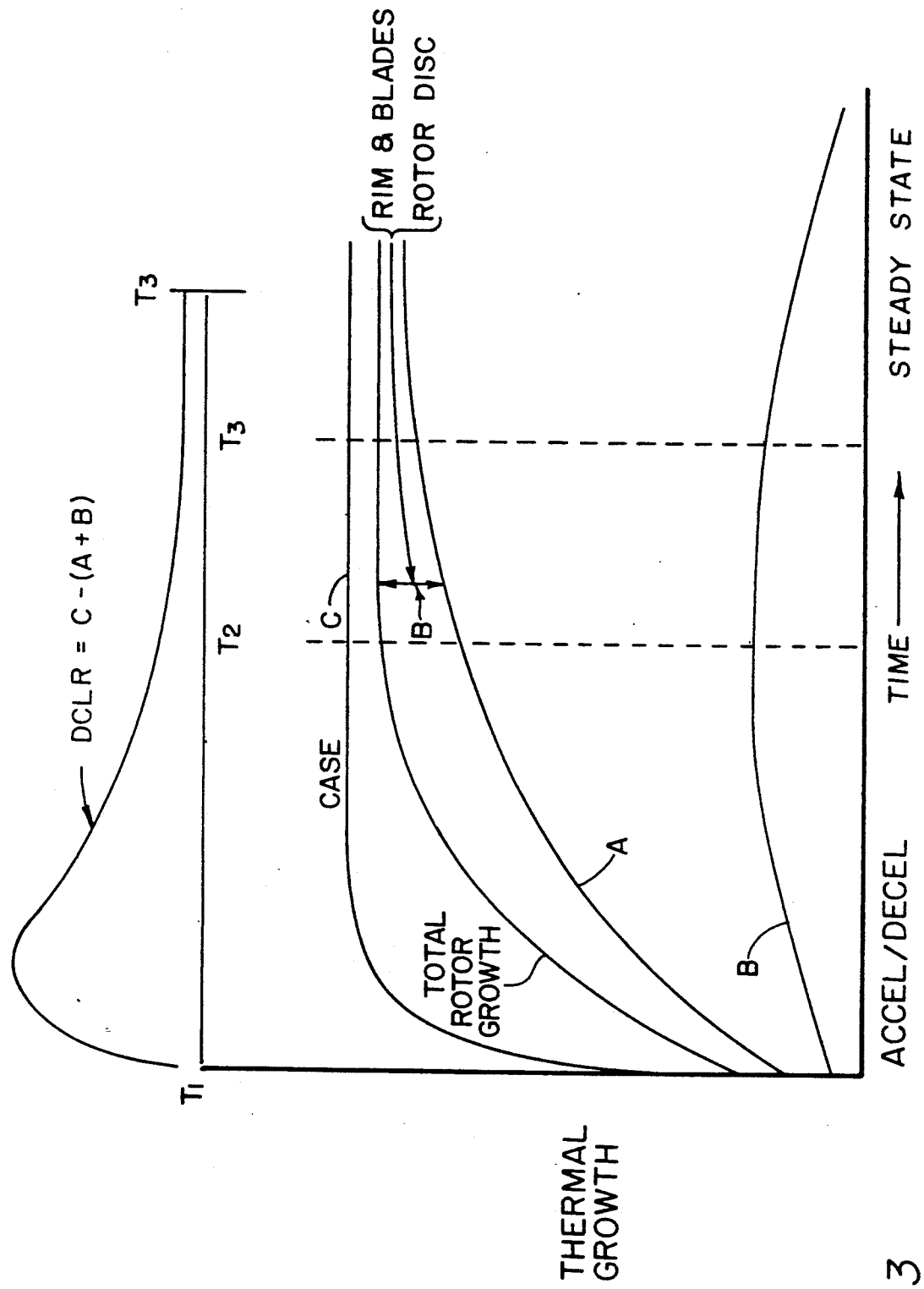
FIG. 3 is a time-based graph showing the thermal characteristics of the rotor disk, the rim and blades and the case as synthesized signals produced according to the present invention and includes an additional signal showing the change in clearance between the disk and the blades as a function of time. These signals are on a common time line.

In FIG. 1, a gas turbine 10 contains a compressor section 11 which includes a plurality of compressor stages 11.1, each stage comprising a disk (11.1), a rim on the disk (11.2), and compressor blades (11.3) on that rim. A case 9 contains the compressor.

The stator is not seen in FIG. 1, but appears in the enlargement in FIG. 2 under numeral 12. The stator has movable vanes 12, which can be individually moved by respective controls A and B to control air flow to compressor blades 11.3 on the rim 11.2. U.S. Pat. No. 4,995,786 shows similar vanes under the reference numeral 24. There, the movement of the blades 24 is provided by a control arm 48, which corresponds to the control arms A and B shown in FIG. 2. For the purposes of this discussion, it is sufficient to understand that the position of the vanes is varied by a stator position control 13 in FIG. 1 in response to the sum of two signals DCVV and CVV, the magnitude of which determines vane deflection.

In FIG. 1, a digital fuel control 14 controls fuel flow through a line 15 to the engine on a line 17. The fuel control contains a central processing unit, or computer 14.3, which is connected to its "environment" by an input/output section 14.2. The input/output section is connected by a line 16.1 to a power lever 16 to receive a signal indicating the magnitude of power lever advance PLA. A signal indicating the atmosphere pressure is also provided to the input/output section 14.2, indicating $N_2$ from a sensor 22. Inlet pressure PT2 is provided over a line to the input/output section. A signal PB, indicating the compressor pressure, is provided over a line. A signal TEMP, indicating the compressor temperature, is also provided to the input/output section. The control 14 also receives a signal indicating the speed of the gas turbine's low speed fan section $N_1$ over a line 20.1 from a sensor 20.

In the following discussion it will be explained that the control 14 controls the positioning of the vanes 12 by varying the magnitude of a signal DCVV+CVV, by synthesizing the temporary growth in the space between the blade tips and the case when engine acceleration begins to vary DCVV. The processor performs these routines by sensing PT2 and PB.

Figure 5:
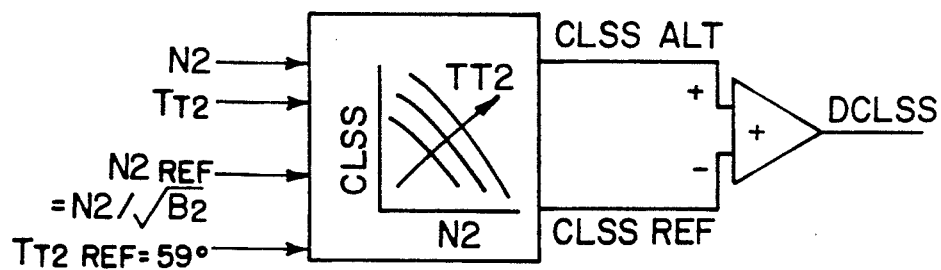
FIGS. 5-8 are block diagrams of four transfer functions employed in generating signals.
Figure 7:
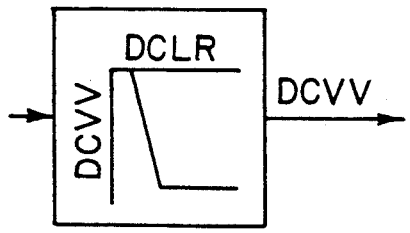

In FIG. 3, a signal DCLTR represents the change in clearance between the tips and the case, and increases from some nominal value at $T_1$ to a peak at $T_2$ and then ultimately decays back to nearly the nominal value at $T_3$. The signal is synthesized in the present invention by synthesizing three distinct signals, one for the change in radial thermal size of the rotor disk, one for the rim and blades, and one for the case as shown in FIG. 5. Each of these components has its own unique thermal dynamic growth characteristics represented by its own thermal time constant ($\tau_C$, $\tau_D$, $\tau_R$) which is made more accurate at any operating condition by multiplying by R which is a function of compressor pressure (Equation 1). In FIG. 3, the thermal expansion of each of these is shown by signals A, B, and C. The signals A and B are subtracted from the signal C, the difference being DCLTR. Signal DCLTR is applied by the computer to the transfer function in FIG. 7 to produce a signal DCVV, which is summed with the normal or steady state signal CVV for controlling the steady state position of the stator control 13. The magnitude of DCVV augments the signal CVV to increase the angle of attack of the vanes 12 as a function of the magnitude of DCLTR. At $T_1$ and at $T_3$, DCLTR is O and the position of the stator blades is determined solely by the magnitude of the signal DC on line 13.1. On acceleration DCLTR follows the shape in FIG. 3.

Figure 4:
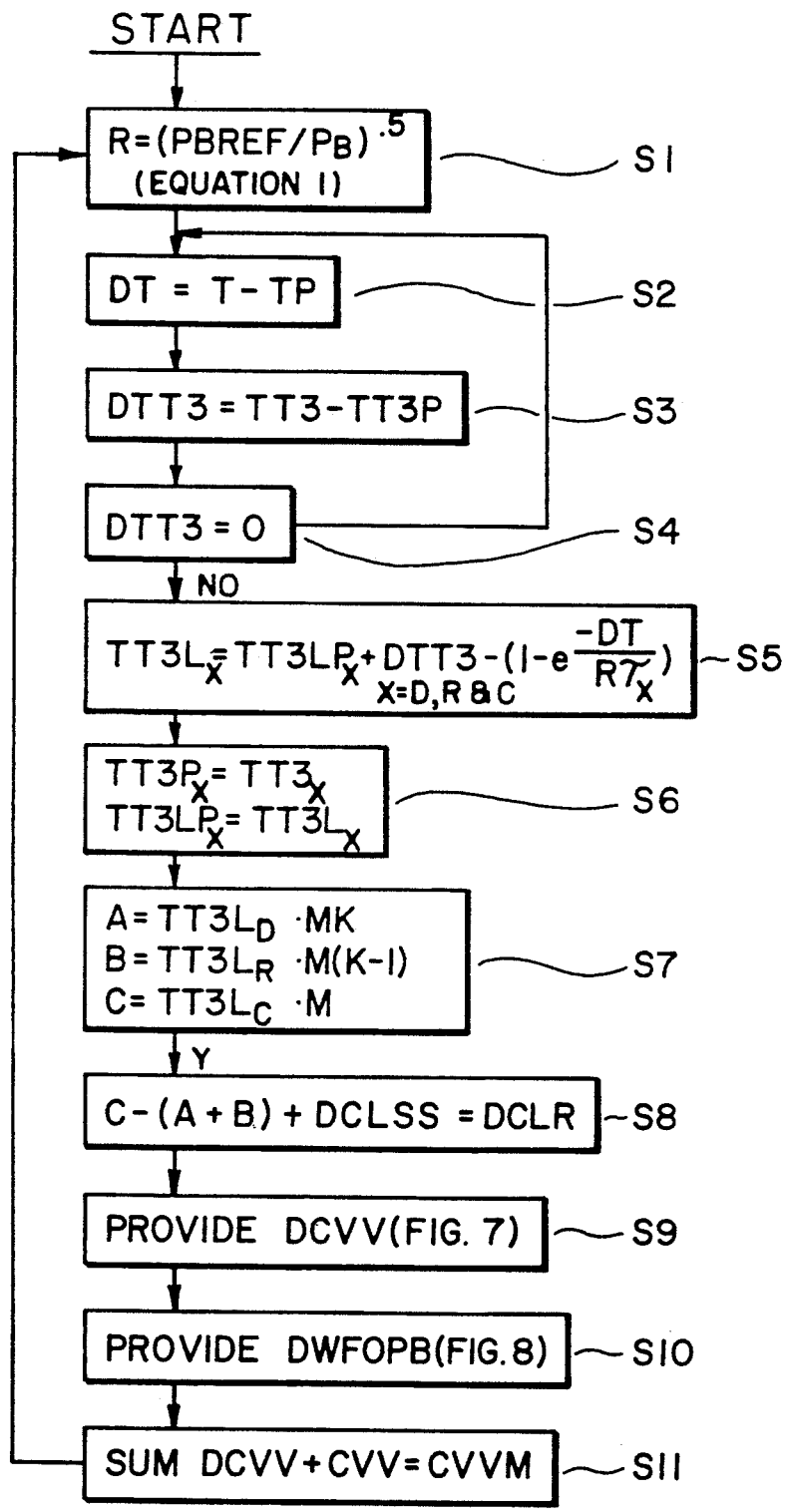
FIG. 4 is a flow chart of signal processing steps for producing a stator control signal and an acceleration fuel derichment signal according to the present invention.
Figure 6:
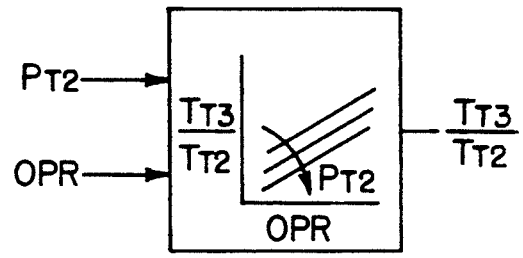
Figure 8:
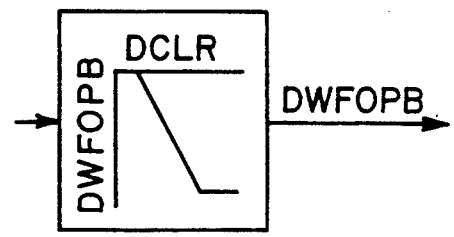

In the equations 1-4 that follow, M is a proportionality constant and K is a "weighting" factor, as a percentage, corresponding to the proportion of total thermal growth associated with the disc, e.g., 70%. With the aid of the flow chart shown in FIG. 4, equations 1-4 set forth below and the transfer functions shown in FIGS. 5-8, the signal processing routine by which the signal DCVV is generated and then summed with the signal CVV will now be explained. Beginning in step 1, the scaling factor R is computed using Equation 1, to compensate the time constants as a function of the compressor pressure, which directly effects the thermal expansion rate of the disk rotor and case. It should be noted that the production of the three signals A, B, C associated with the disk rotor and case is effected incrementally by the signal processor in discrete steps having a duration "DT". As described at step S2, DT is equal to the change in time T from a previous time TP. This "sampling interval" is arbitrarily based upon the computing time and may be something like 50 ms. It is particularly important to realize that from this sampling interval DT, a signal is synthesized from PT2 and OPR using the transfer function in FIG. 6, in incremental steps, manifesting an increase in engine power. In particular, in step S3, a change in TT3 (DTT3) is measured, and, in step S4, a test is made to determine whether or not there has been a change within the sampling time DT there has been a change in engine power. If there has been no change, an affirmative answer in step S4, the process returns to step S2, once again to see if there has been a sufficient change in DTT3 within the sampling time DT. If, however, the change is detected in step S4 (a negative answer), the sequence proceeds to step S5. In step S5, a signal TT3L is separately computed for the disc rotor and the case. In FIG. 4, this signal is identified as $TT3_x$ where x identifies the disc (D), case (C) and rotor (R). TT3L, an exponential curve over time, is computed by adding the previously stored level of TT3L (TT3LP) and summing this with the product of the change in TT3 (DTT3 in step S3) and an expontential value for the increment of time DT based upon the time constant $R\tau$. In step S6, the previously computed value for TT3P is entered as the updated value for TT3 and the value of TT3LP is entered as the updated value of TT3L. This carries out the iterative process over on e increment of time DT by which one increment of signal TT3L is synthesized. In step S7, the value for each of the signals A, B, and C is produced based upon the instantaneous values at that time for TT3L, using Equations 2, 3 and 4 set forth below. (The subscript D, R and C in these equations identifies the time constant for the disk, rotor and case, respectively.) In step S8, the reference to "DCLSS" refers to the signal produced according to the transfer function shown in FIG. 5. DCLSS is a signal representing a programmed adjustment for the vane deflection based upon the difference between a computed clearance (CLSSREF) at standard operating conditions and a computer clearance (CLSSALT) computed. Both CLSSREF and CLSSALT are produced from using the same transfer function, shown in FIG. 5, based on actual N2 and actual TT2. In step S9, a signal DCLR, which is produced in step S8, is processed to produce the vane deflection signal DCVV using the transfer function shown in FIG. 7. Similarly, in step S10, the value of DCLR, computed in step S8, is used to provide a fuel derichment signal (DWFOPB) following the general transfer function shown in FIG. 8. Finally, in step S11, DCVV is summed with the actual (normal) vane deflection signal (CVV) to control the orientation of the stator vanes. As a result of these steps, it should be noted that the stall margin of the compressor is temporarily lowered when the signal DCLR reaches its maximum in FIG. 3 and then is restored to a static level at and after time T3 as a direct function of CVV. However, the magnitude of the stall margin at that time will be augmented, nonetheless, by the magnitude of the signal DCLSS.

$$R = (PBREF/P_B)^{.5} \quad \text{Equation 1}$$

$$\frac{M \cdot K}{1 + R\tau_D S} \quad \text{Equation 2}$$

$$\frac{M(K-1)}{1 + R\tau_R S} \quad \text{Equation 3}$$

$$\frac{M}{1 + R\tau_C S} \quad \text{Equation 4}$$

While the foregoing is a description of the best mode for carrying out the invention, it can be easily appreciated that certain aspects of the invention may be changed, in whole or in part, without departing from the true scope and spirit of the invention. For example, it is possible to actually sense acceleration speed by sensing the change in $N_2$ rather than synthesizing the onset of an acceleration using P2 and a calculated OPR. instead of synthesizing a representative gas temperature TT3 from calculated OPR and P2, it is possible to synthesize another representative gas temperature based on some other calculated engine parameter such as corrected rotor speed, which is indicative of power level change. Similarly, depending upon the particular engine, the scaling factor R, which increases the time delay of the signals A, B and C based upon actual burner pressure to accommodate the greater heat transfer, may take into account other factors associated with the heat transfer characteristics within the compressor stage. Of course, the signals A, B, C can be produced with analog processing, for instance, by applying a step signal in response to TT3 to three filters with the time constants $R\tau_D$, $R\tau_R$, $R\tau_C$. Other modifications and variations may be apparent to one skilled in the art with the benefit of the foregoing explanation of the invention.

I claim:

1. A control for a gas turbine engine having a compressor comprising a case, disk and rim with compressor blades at a clearance from the case, and stator vanes and a stator vane control to adjust stall margin in the compressor, characterized by:
   signal processing means comprising:
   means for providing a first signal with a magnitude that indicates a commanded increase in engine power;
   means for providing a second signal in response to said first signal, the magnitude of said second signal increasing with time according to expected thermal radical expansion of the engine case;
   means for providing a third signal in response to said first signal, the magnitude of said third signal increasing with time according to expected thermal radial expansion of the disk;
   means for providing a fourth signal in response to said first signal, the magnitude of said fourth signal increasing with time according to expected thermal radial expansion of the rim and blades;
   means for subtracting said third and fourth signals from said second signal to produce a fifth signal, the magnitude of said fifth signal representing the increase in clearance between the blade and the case;
   means for providing a sixth signal the magnitude of the sixth signal representing an increase, which is a function of the fifth signal, in vane defection;
   means for providing a seventh signal, the magnitude of which determines a first deflection of the vanes to produce a first engine stall margin; and
   means for summing said sixth signal with the seventh signal to produce an eighth signal supplied to the stator control to control the deflection of the vanes as a function of the magnitude of the eighth signal and produce a second stall margin greater than said first stall margin as a function of the magnitude of the sixth signal.

2. A control according to claim 1, further characterized by:
   means for multiplying the case, rim, and disk thermal time constants of the second, third, and fourth signals with a ninth signal which is a function of compressor pressure to accurately represent the thermal expansion for all operating conditions.

3. A control according to claims 1 or 2, further characterized in that:
   the magnitude of the first signal is calculated from compressor burner pressure, engine inlet total pressure and temperature and a measured engine temperature.

4. A method for controlling stall margin in a gas turbine engine having a compressor comprising a case, disk and rim with compressor blades at a clearance from the case, and stator vanes and a stator vane control to adjust stall margin in the compressor, characterized by the steps:
   providing a first signal with magnitude that indicates a commanded increase in engine power;
   providing a second signal in response to said first signal, the magnitude of said second signal increasing with time according to expected thermal radial expansion of the engine case;
   providing a third signal in response to said first signal, the magnitude of said second signal increasing with time according to expected thermal radial expansion of the disk;
   providing a fourt signal in response to said first signal, the magnitude of said fourth signal increasing with time according to expected thermal radial expansion of the rim and blades;
   subtracting said third and fourth signals from said second signal to produce a fifth signal, the magnitude of said fifth signal representing the increase in clearance between the blade and the case;
   providing a sixth signal, the magnitude of the sixth signal representing an increase, which is a function of the fifth signal, in van deflection;
   providing a seventh signal, the magnitude of which determines a first deflection of the vanes to produce a first engine stall margin; and
   summing said sixth signal with the seventh signal to produce an eighth signal supplied to the stator control to control the deflection of the vanes as a function of the magnitude of the eighth signal and produce a second stall margin greater than said first stall margin as a function of the magnitude of the sixth signal.

5. A method according to claim 4, further characterized by the steps:
   multiplying the case, rim, and disk thermal time constants of the second, third, and fourth signals with a ninth signal which is a function of compressor pressure to accurately represent the thermal expansion for all operating conditions.

6. A method according to claims 4 or 5, further characterized by the step:
   calculating magnitude of the first signal from compressor burner pressure, engine inlet total pressure and temperature and a measured engine temperature.

* * * * *

UNITED STATES PATENT AND TRADEMARK OFFICE
CERTIFICATE OF CORRECTION

PATENT NO. : 5,165,845
DATED : 11/24/92
INVENTOR(S) : Syed J. Khalid

It is certified that error appears in the above-identified patent and that said Letters Patent is hereby corrected as shown below:

After "Cross Reference to Other Applications" insert --This application describes apparatus also described in the application titled ON-LINE STALL MARGIN ADJUSTMENT IN A GAS TURBINE ENGINE by Syed J. Khalid, Serial No. 07/789,556, also assigned to United Technologies Corporation and filed simultaneously herewith.--

Col. 1, line 64, "disk, rim blades" should read --disk, rim and blades--.

Col. 4, line 31, "expontential" should read --exponential--.

Col. 4, line 36, "on e" should read --one--.

Claim 1, col. 5, line 49, "radical" should read --radial--.

Claim 1, col. 5, line 65, "defection" should read --deflection--.

Claim 4, col. 6, line 45, "van" should read --vane--.

Signed and Sealed this

Eighth Day of February, 1994

Attest:

BRUCE LEHMAN

Attesting Officer     Commissioner of Patents and Trademarks